Oct. 17, 1939.  E. A. HOBART  2,176,341
WELDING APPARATUS
Filed June 24, 1938    3 Sheets-Sheet 1

INVENTOR
EDWARD A. HOBART
BY
Toulmin & Toulmin
ATTORNEYS

Oct. 17, 1939.  E. A. HOBART  2,176,341
WELDING APPARATUS
Filed June 24, 1938  3 Sheets-Sheet 2
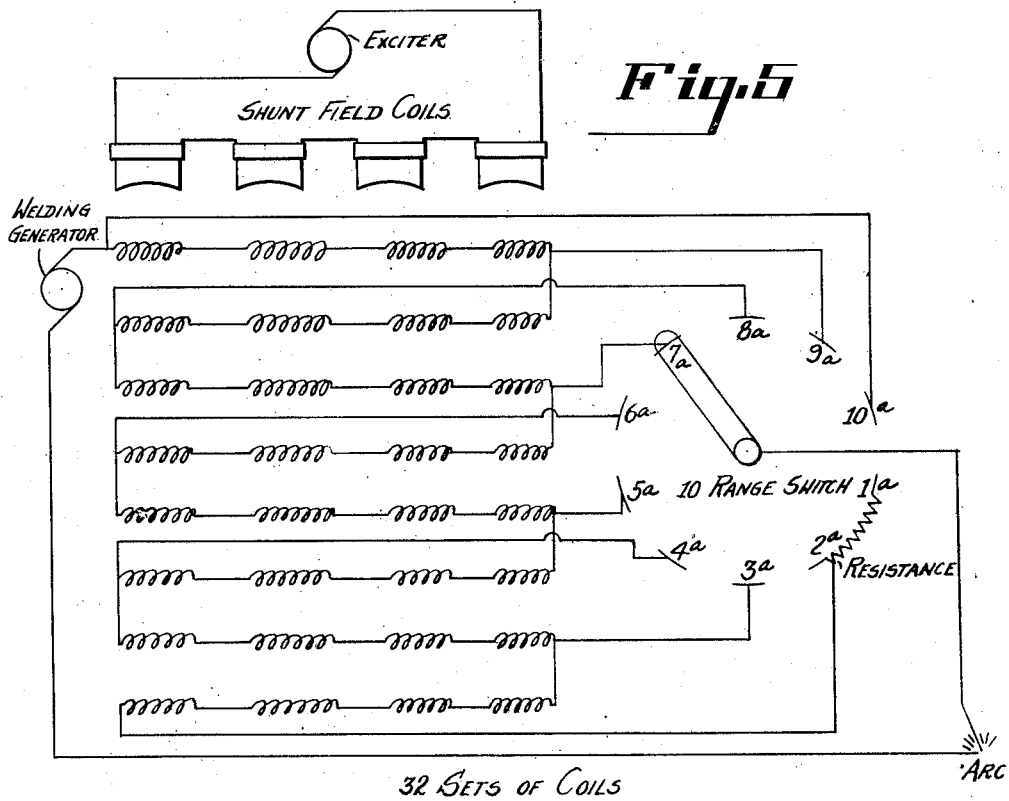
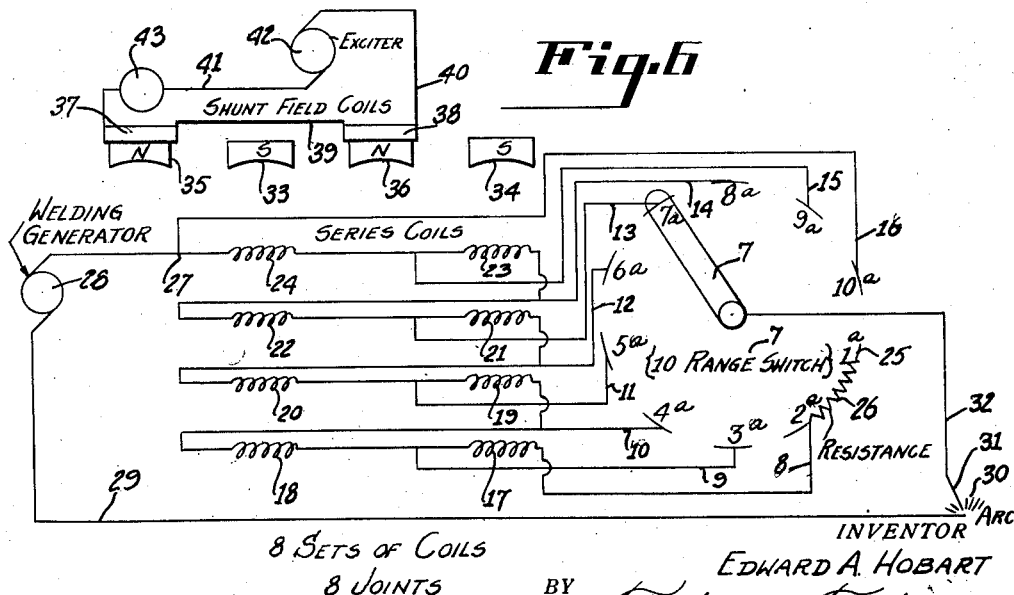
INVENTOR
EDWARD A. HOBART
BY Toulmin & Toulmin
ATTORNEYS Oct. 17, 1939.   E. A. HOBART   2,176,341
WELDING APPARATUS
Filed June 24, 1938   3 Sheets-Sheet 3

INVENTOR
EDWARD A. HOBART
BY Toulmin & Toulmin
ATTORNEYS

Patented Oct. 17, 1939

2,176,341

UNITED STATES PATENT OFFICE 2,176,341

WELDING APPARATUS

Edward A. Hobart, Troy, Ohio, assignor to The Hobart Brothers Company, Troy, Ohio, a corporation of Ohio Application June 24, 1938, Serial No. 215,664

6 Claims. (Cl. 171—223)

My invention relates to electric welders and a method of controlling such welders.

It is the object of my invention to provide a welder with a variable welding range without complicated wiring and connections which make the machine both difficult to manufacture and expensive to make and maintain.

It is my object to provide a welding machine with both a wide welding range and a large number of steps of welding current.

In particular it is my object to provide welder fields so arranged that the shunt fields are on two poles of like polarity and the bucking compound fields are on the remaining two poles of like polarity.

It is a further object to tap in each successive step between each individual series winding.

It is an object to provide such an arrangement for tapping in a consequent pole type of machine.

It is thus possible by this invention to simplify the field arrangement so that the number of field coils is reduced one half. This also results in the additional advantage that by arranging the series field and the shunt field on separate pole pieces, the transformer effect between the shunt and series field is greatly reduced, thus improving the welding characteristics of the machine. By arranging the steps so that they come between each individual series winding, the number of coils is cut in half.

Contrary to what has heretofore been regarded as settled in the art, such an arrangement does not give a disastrous unbalancing effect to the armature which is detrimental to its operation. It has been found in operating a machine of this invention that as a matter of fact no such disastrous unbalancing occurs.

The simplification of the series winding reduces very materially the cost of the multi-range welder. It also makes a much safer winding with less danger of the joints becoming unsoldered and breaking down.

Therefore, I have provided a consequent pole type of machine in which the steps come between each individual series winding.

As hereinafter pointed out, the advantages over the prior art machines are not only those of economy in manufacture and safety in operation, but dead points are avoided and welding is good from the highest to the lowest range. The reduction in voltage range also results so that it is possible to get a voltage range from eighty to sixty-five or a voltage of only fifteen volts, which is distinguished from the best previous change of voltage, which was thirty volts or more.

Since the arc voltage varies from twenty-five to forty volts, it is not wise to try to carry the voltage of the welder too low by increasing the resistance of the field rheostat and obtaining too much regulation by this method. It is far better to throw the burden of the regulation on to the series field adjustment and then the voltage can be maintained at a high point and welding is good throughout the range.

With one hundred steps of regulation in the small field rheostat and ten steps in the ten range series field adjustment, a total of one thousand different settings of welding output can be made so that good welding characteristics can be obtained all the way from the very lowest to the very highest output of the welding machine.

Referring to the drawings, which contrast the best prior art with the present invention:

Figure 4:
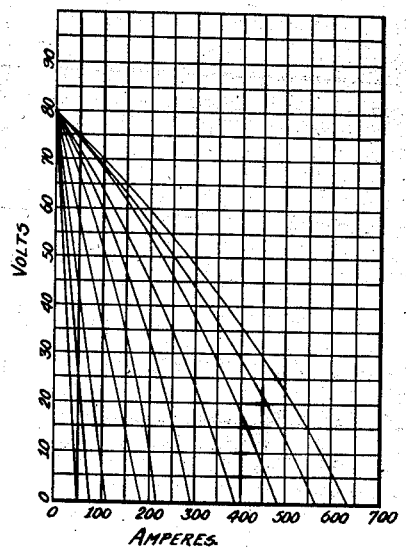
Figure 7:
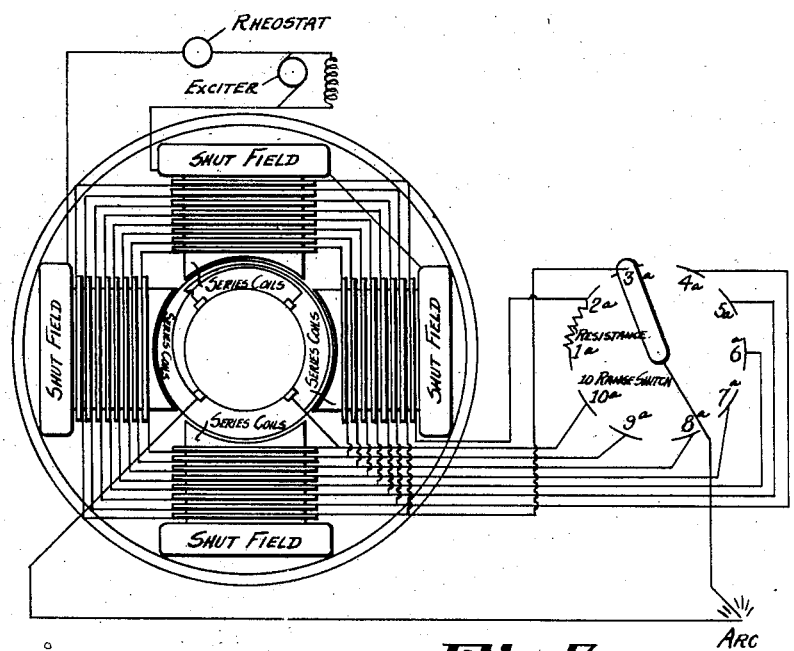
Figure 8:
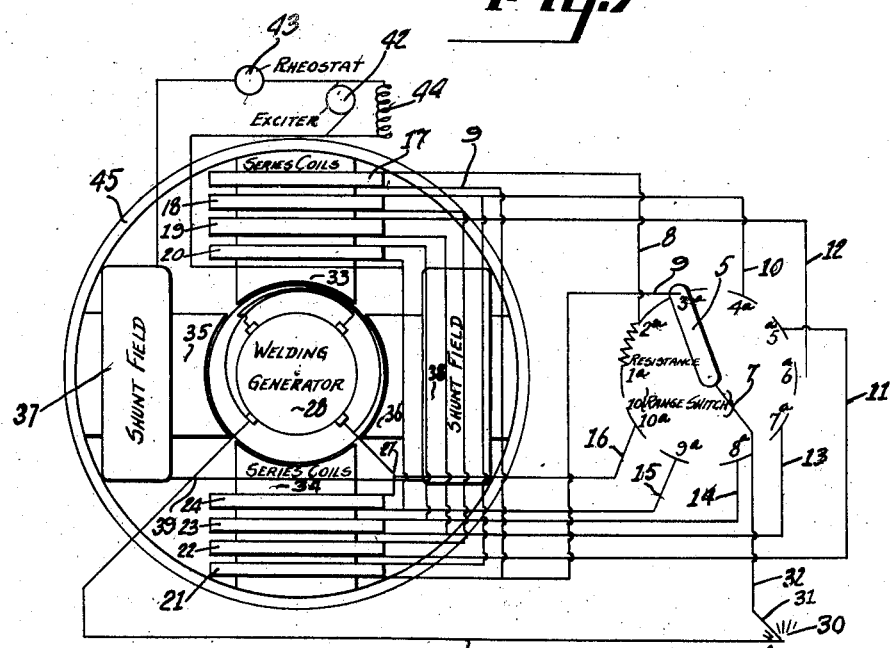

Figure 4 shows the graph indicating the performance of the machine of this invention in which it will be seen that it is almost impossible to find a place where you can weld without still maintaining the voltage at a very high rate. In fact, with a large number of steps of the bucking compound winding, it is possible to have a much narrower range of voltage for the intermediate steps. This allows plenty of voltage drop between the arc voltage and no load voltage of the machine, while still covering the range thoroughly without any dead spots;

Figure 5 shows the usual method of the prior art of connecting a multi-range bucking compound winding;

Figure 6 shows the electrical circuits of this invention;

Figure 7 shows the standardized multi-range windings with the coils placed on an actual machine, such as now used in the prior art; and Figure 8 shows the simplified wiring arrangement of the present invention also mounted upon the machine.

*Prior art and this invention contrasted*

The advance in this art by my invention is best demonstrated by a comparison of the prior art as now practiced and as illustrated in Figures 1, 2, 5 and 7 with my invention as illustrated in Figure 3, 4, 6 and 8.

The trend of welding machine design is toward a welding machine with wide welding range and a great many steps of welding current. Two methods have been employed to give this wide range in the past. The first method is to vary the exciter fields which of course changes the voltage of the welder and the second method is to change the number of turns of bucking or opposing series fields so as to vary the output. The combination of these two methods makes a very good machine but not good enough if the steps in the bucking compound or series field are few in number.

With, for instance, only three steps in this series field in order to change from one range to another, the field rheostat has to be increased to a point where the voltage becomes so low that welding is not good at the changeover point and we have what is called a dead spot or spot where the voltage becomes too low to weld at a given current output.

The ideal machine, therefore, has a great many steps in the series field.

By dividing the series field into nine or ten different steps, these dead points are avoided and the welding is good from the highest to the lowest range and dead spots are eliminated.

Since the arc voltage varies from twenty-five to forty volts, it is not wise to try to carry the voltage of the welder too low by increasing the resistance of the field rheostat and obtaining too much regulation by this method. It is far better to throw the burden of the regulation on to the series field adjustment and then the voltage can be maintained at a high point and welding is good throughout the range. By using a ten range switch instead of a three range switch, it is possible to use less resistance in the field rheostat and instead of having the range of voltage changed between eighty and fifty, or thirty volts, it can be reduced to a range of from eighty to sixty-five or only fifteen volts.

With one hundred steps of regulation in the small field rheostat and ten steps in the ten range series field adjustment, a total of one thousand different settings of welding output can be made so that welding characteristics can be obtained all the way from the very lowest to the very highest output of the welding machine.

Two usual methods of obtaining a variable bucking compound field are first by the use of resistance in parallel with the compound winding which can be gradually cut in and out at will, thus diverting the current either through the resistance or through the bucking compound winding as desired, and the second method is the tapping in at various points on the compound winding to obtain various degrees of current output.

The first method has its objections in the fact that whenever a resistance is in parallel with the bucking compound winding it acts as a deadener to the reactance effect of this compound winding and thus destroys its reactive kick which is highly desirable in order to maintain the arc for welding. Quite often an inductive type of resistance or shunt is used to overcome this, but by employing this method an added complication is built into the welder.

The second method—tapping the bucking series field is the best method but it also has its objection, due to the fact that in order to obtain any large number of steps, a great number of bucking compound fields are required and a large number of joints and taps make a very bulky and unsafe winding, especially where heavy loads have to be carried.

Figure 1:
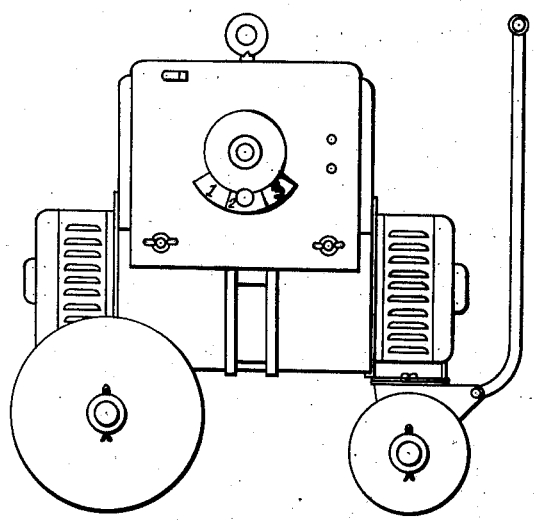
Figure 1 shows the conventional type of machine now built with three main steps in the compound windings.
Figure 2:
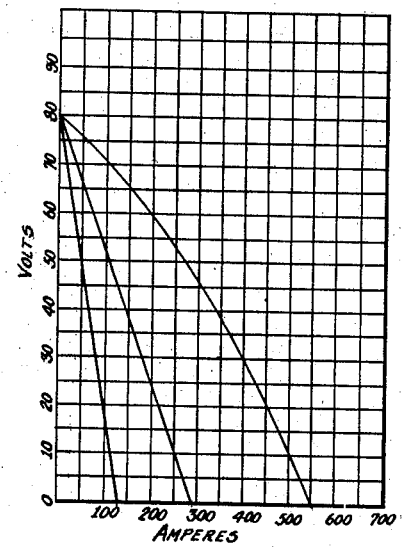
Figure 2 shows a graph indicating the performance of the machine of Figure 1.

Figures 1 and 2 show the conventional type of machines that are built at the present time with three main steps in the compound windings. Assuming that the voltage of the arc is forty volts, there are only three possible welding heats that can be obtained with this machine without varying the field rheostat which gives the intermediate steps. Now while you can get a great many intermediate steps with the field rheostat in between, it is found that with only three main steps to the bucking compound winding sometimes the voltage has to be reduced so low, perhaps down to fifty volts in order to fill in the intermediate steps, that welding at some of these steps is not good. When there are only ten volts difference between the no load voltage of the arc welder and the arc itself, the stability of the arc is more or less uncertain. Therefore, this type of machine has what are called dead spots.

Figure 3:
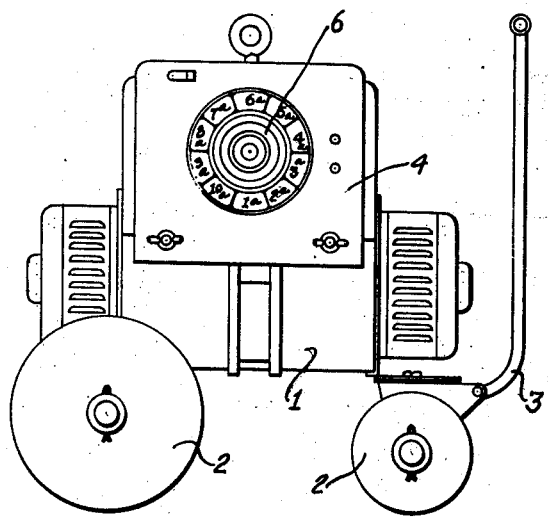
Figure 3 shows the same machine arranged in accordance with this invention with ten steps in the bucking compound winding.

Figures 3 and 4, however, show the same machine arranged with ten steps in the bucking compound winding and it will be seen that the field is very well covered, and that it is almost impossible to find a place where you cannot weld without still maintaining the voltage at a very high rate. In fact, with a large number of steps of bucking compound winding it is possible to have a much narrower range of voltage for the intermediate steps thus allowing plenty of voltage drop between the arc voltage and no load voltage of the machine and still covering the range thoroughly without any dead spots.

Figure 5 shows the usual method of connecting a multi-range bucking compound winding. Assuming that nine steps are required, ten from the variable compound winding and one from the machine operating as a plain shunt machine with no compound winding in, the compound winding would have to circle the four pole pieces eight times, making use of thirty-two separate compound windings all told with thirty-two joints in order to obtain the nine required steps.

Figure 6 shows my invention and a new simplified method of connecting up the bucking compound winding so that the same results are obtained with only eight separate series fields and only eight connections. The same excellent welding results, together with the large number of steps of regulation, are obtained by this simplified winding as with the thirty-two separate bucking compound windings.

Figure 7 shows the standardized multi-range windings with the coils placed on an actual machine instead of spread out in diagrammatic form. With this winding one can see how very complicated it becomes with the large number of separate series fields which have to be tied together and with the current having to make the complete circle of the four series fields before it can be brought out at the switch.

Figure 8 shows the simplified wiring diagram which covers my invention and shows how the number of coils required are reduced from thirty-two to eight, and the number of soldered joints that are necessary are reduced from thirty-two joints to eight joints.

By my invention the first simplification is obtained by arranging the welder fields so that the shunt fields are on two poles of like polarity and the bucking compound fields are on the remaining two poles of like polarity. In other words, the machine is arranged as a consequent pole type of machine. It can be seen that this alone cuts down the number of field coils to one half. It has the additional advantage that by arranging the series field and the shunt field on separate pole pieces, the transformer effect between the shunt and series field is greatly reduced, thus improving the welding characteristics.

My second method of simplifying and reducing the number of series coils is by tapping in each succesive step, not at a point after the complete circle of compound windings is made for each step, but arranging the steps so that they come between each individual series winding, thus again cutting the number of coils required in half. This, I believe to be an entirely new and novel idea for the general impression is that such an arrangement would give a disastrous unbalancing effect to the armature which would be detrimental to its operation.

As a matter of fact, no such disastrous unbalancing occurs for a great many machines have been built with this sort of a winding and either the amount of unbalance which occurred by this tap is so slight, due to the fact that the change in turns is small between the steps, or else the flux distributes itself internally in the armature in such a way that no bad effects are noticeable and we have a perfectly operated welder.

This simplification of the series winding reduces very materially the cost of the multi-range welder as well as making a much more fool proof winding with less danger of joints becoming unsoldered and breaking down.

*Wiring arrangement of this invention*

Referring to Figures 3, 4, 6 and 8, the welding generator is designated generally by the numeral 1. It is preferably mounted upon a truck having wheels 2 and a handle 3. Mounted upon the generator is an enclosure 4 in which is mounted the ten range switch which has ten steps as indicated at 1a–10a, inclusive. The contact lever 7 is operated by the hand wheel 6.

Turning to the wiring diagrams 6 and 8, it will be first noted that ten steps marked from one to ten are provided in the range switch 7 of which the contact lever 5 is a part. The taps on this switch are connected by the respective wires 8, 9, 10, 11, 12, 13, 14, 15 and 16 to points intermediate the series coils 17 and 18; 19 and 20; 21 and 22; 23 and 24. In the range switch 7 there is also a tap 25 connected by resistance 26 to tap number 2. Wire 16 connects its tap 10a into the welding generator circuit at 27. 28 indicates the generator and 29 the wire leading to one side of the arc 30, the other side of which is the welding rod 31 and wire 32 which leads to the switch arm 7 that connects this wire to the respective taps 1a, 2a, 3a, 4a, 5a, 6a, 7a, 8a, 9a and 10a.

It will be noted that the series coils are mounted, four each, upon opposite poles 33 and 34. Intermediate these opposite poles are the opposite shunt field poles 35 and 36. Mounted on these poles 35 and 36 are the shunt field coils 37 and 38 connected by the line 39 to each other and by the lines 40 and 41 to the exciter 42. In the exciter line 41 is a rheostat 43. The exciter is provided with the usual coil 44.

I now have provided by this arrangement a vastly simplified generator of the consequent pole type. There is mounted in the frame 45 the opposite series coil poles 33 and 34 on which are mounted the coils 17 to 24, inclusive. The ten range switch is connected into points between pairs of those coils. The two groups of coils are thus arranged 180 degrees from one another and between them, 90 degrees away, are the shunt field poles and shunt fields. In the shunt field exciter circuit is mounted the rheostat 43. With one hundred steps of regulation in the small field rheostat 43 and ten steps in the ten range series field of the ten range switch, a total of one thousand different settings of welding current can be made so that good welding characteristics can be obtained all the way from the very lowest to the very highest output of the machine.

It will be understood that I desire to comprehend within my invention such modifications as come within the scope of the claims and the invention.

Having thus fully described my invention, what I claim as new and desire to secure by Letters Patent is:

1. In combination, a generator comprising an armature and a plurality of north-south pairs of poles, shunt windings on only one pole of each pair, a series winding on only the other pole of each pair, the field of said series winding having a bucking relation with respect to the field of said shunt windings, an output circuit connected to said armature, and a multi-contact switch connected between said output circuit and each of said series windings.

2. In combination, a generator comprising an armature and a plurality of north-south pairs of poles, a shunt winding on only a similar pole of each pair and a series winding on the other pole of each pair, an output circuit connected to said armature, and a multi-contact switch connected between said output circuit and points taken from between each pair of series windings.

3. In combination, a generator comprising an armature and a plurality of north-south pairs of poles, a shunt winding on each of said north poles and a series winding on each of said south poles, an output circuit connected to each armature, and a multi-contact switch connected between said output circuit and the points on the series windings between each occurring pair of south poles.

4. In combination, a generator comprising an armature and a plurality of north-south pairs of poles, a shunt winding on each of said north poles and a series winding on each of said south poles, an output circuit connected to each armature, and a multi-contact switch connected between said output circuit and the points on the series windings between each occurring pair of south poles, said switch having an additional contact connected through a resistor to one of the series winding contacts.

5. In combination, a generator comprising an armature, a plurality of north-south pairs of poles, a shunt winding on only poles of the same polarity, means for adjusting the resistance of the shunt winding in fine increments, series coils on only poles of the opposite polarity, a multi-contact switch connected between said armature and points taken from between each pair of series coils, whereby the operation of the switch controls the number of series coils which are connected to the armature in order to change the armature voltage in rough steps, the resistance of the shunt winding being changed to provide said armature voltage with fine increments between the rough steps of voltage change obtained by movement of the multi-contact switch.

6. In the operation of a generator comprising an armature, a plurality of north-south pairs of poles, a shunt winding on only poles of the same polarity, means for adjusting the resistance of the shunt winding in fine increments, a series winding on only poles of the opposite polarity, means for adjusting the resistance of the series winding in rough increments, said last-mentioned means including a multi-contact switch which controls the number of series windings, the method of controlling the voltage of the armature current by adjusting the resistance of the series winding in steps depending upon the position of the multi-contact switch and simultaneously adjusting the resistance of the shunt winding in fine increments between the change in resistance steps of the series winding.

EDWARD A. HOBART.